(12) United States Patent
Tanaka et al.

(10) Patent No.: US 6,477,461 B2
(45) Date of Patent: Nov. 5, 2002

(54) NAVIGATION SYSTEM AND METHOD CAPABLE OF REGISTERING NEW LOCATIONS

(75) Inventors: Kenjiro Tanaka, Kariya (JP); Yoshihiko Sugawara, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/897,065

(22) Filed: Jul. 3, 2001

(65) Prior Publication Data

US 2002/0013658 A1 Jan. 31, 2002

(30) Foreign Application Priority Data

Jul. 26, 2000 (JP) ........................................ 2000-225771
Feb. 28, 2001 (JP) ........................................ 2001-055068

(51) Int. Cl.$^7$ ........................... G08G 1/123; G06F 17/00
(52) U.S. Cl. ..................... 701/209; 701/201; 701/210; 340/988; 340/995; 341/23
(58) Field of Search .................................. 701/209, 200, 701/201, 208, 210; 340/988, 995, 990; 341/23; 345/146

(56) References Cited

U.S. PATENT DOCUMENTS 5,825,306 A  * 10/1998 Hiyokawa et al. .......... 340/988

6,038,509 A  *  3/2000 Poppen et al. .............. 701/210

FOREIGN PATENT DOCUMENTS

| EP | 0633452 A1 | 7/1994 |
| JP | A-9-114368 | 5/1997 |
| JP | A-10-111141 | 4/1998 |
| JP | A-2000-112347 | 4/2000 |

* cited by examiner

*Primary Examiner*—William A. Cuchlinski, Jr.
*Assistant Examiner*—Arthur D. Donnelly
(74) *Attorney, Agent, or Firm*—Law Offices of David G. Posz (57) ABSTRACT

A navigation system for vehicles has a rewritable memory, which stores data of a plurality of locations, and searches the rewritable memory for a target location for use in guiding a travel route. When a user inputs a new location for registration, data of an input new location is stored in the rewritable memory in addition to original data of the plurality of locations. This data of new location may be stored by updating the original data or by adding separately from the original data. When a user requests a search for the target location by a name of the target location, the navigation system searches it alphabetically by referring to both data of the plurality of locations and the new location. The navigations system may be designed to conduct the location search by a facility type.

10 Claims, 7 Drawing Sheets

| DATA | ITEM | | | | | |
|---|---|---|---|---|---|---|
| | NAME | LAT | LONG | AREA | TYPE | |
| △△OFFICE | △△OFFICE | f7565 | 3c2a48 | 23106 | 7080 | -------- |
| ⋮ | ⋮ | ⋮ | ⋮ | ⋮ | ⋮ | ⋮ |

NAVIGATION SYSTEM AND METHOD CAPABLE OF REGISTERING NEW LOCATIONS

CROSS REFERENCE TO RELATED APPLICATION

This application is based on and. incorporates herein by reference Japanese Patent Applications No. 2000-225771 filed Jul. 26, 2000 and 2001-55068 filed Feb. 28, 2001.

BACKGROUND OF THE INVENTION

The present invention relates to a navigation system, which searches for a corresponding location from an input location by the use of a search list and searches for a target location from a selected facility type by the use of a search list.

In a navigation system disclosed in JP-A-10-111141, location names of various facilities are preliminarily stored as a search list and a target location is searched from an input location name by the use of the search list. This search is conducted alphabetically in Japanese 50-alphabet system. The searched location is used as a destination or a passing point in a travel route guidance. It is also used to indicate a road or area map, which includes the searched location.

In another navigation system, a user registers his/her home location and friend's locations. The registered locations are used in a travel route guidance or in map display.

However, the above Japanese alphabetical search (alphabet-based search) method uses the search list, which stores the location names of facilities and the like. The registered locations input by the user cannot be subjected to the alphabet-based search. As a result, the user-registered locations must be searched in another method other than the alphabet-based search method.

Still another navigation system has a function of a facility search or a surroundings search in addition to the alphabet-based search. The facility search or the surroundings search is conducted by the use of a search list, which stores data of names of locations, coordinates of locations, types of facilities and the like. This navigation system will be useful if registered locations input by a user can be made a subject of:the facility search or the surroundings search.

SUMMARY OF THE INVENTION

It is therefore an object of the present invention to provide a navigation system, in which registered locations input by users can be made a subject of an alphabet-based search.

It is another object of the present invention to provide a navigation system, in which registered locations input by users can be made a subject of a facility search or a surroundings search based on a facility type-based search.

According to the present invention, a navigation system has a rewritable memory which originally stores data of a plurality of locations. When a user inputs a new location other than the plurality of locations, the navigation system registers and stores data of the new location in the rewritable memory in addition to the data of the plurality of locations. When a user requests a search of a target location from the external side, the navigation system searches the rewritable memory for the target location with reference to the data of the plurality of locations and the new location. The navigation system displays on its display unit the target location.

Preferably, the target location is defined by a location name, and the navigation system conducts a search based on alphabets. The target location may be defined by a facility type, and the navigation system conducts a search based on the facility type. In addition, the target location may be defined along with a request for a surrounding search, and the navigation system conducts searching for surrounding locations other than the target location.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
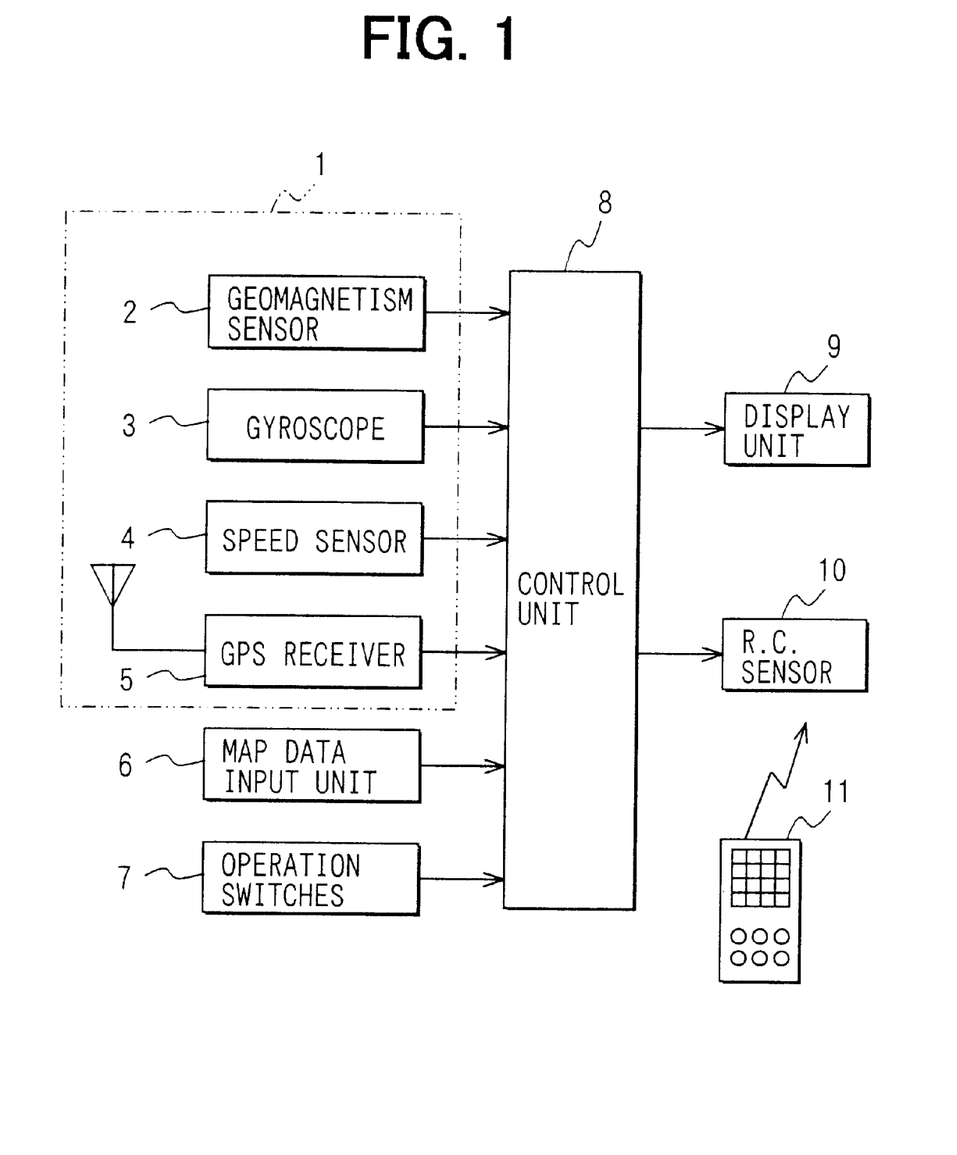
FIG. 1 is a block diagram showing a navigation system according to a first embodiment of the present.invention.

Referring first to FIG. 1, a navigation system for vehicles has a position detector unit 1 for detecting the present position of a vehicle. This unit 1 includes a geomagnetism sensor 2, a gyroscope 3, a vehicle speed sensor 4 and a global positioning system (GPS) receiver 5. The navigation system also has a map data input unit 6 for retrieving the map data from a map data memory medium (not shown), a group of operation switches 7 for instructing various operations required for navigation, an electronic control unit 8 for executing various processing required for navigation, a display unit 9 for displaying a road or area map, and a remote controller sensor 10 for receiving instruction signals from a remote controller 11.

This navigation system has functions of displaying a map including the present location and a travel route guidance to a destination. It also has an additional function of searching target locations from input location name by the use of a search list based on the alphabet-based search method. The alphabet-based search is conducted in the order of Japanese fifty alphabets "a" to "n."

Figure 2:
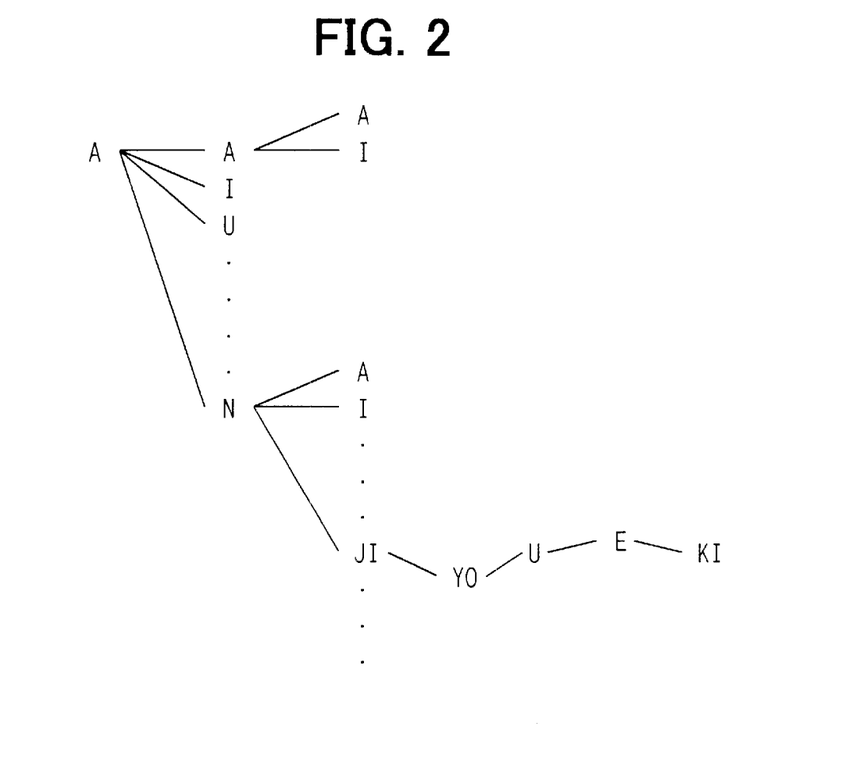
FIG. 2 is a diagram showing a search tree in a search list used in the first embodiment.

As shown in FIG. 2, the search list is stored in the form of search tree so that the target location is searched for in the Japanese alphabetical order. The searched location is specified by location:data such as a coordinate. This searched location is used as a destination or a passing point in guiding the travel route or for displaying in a map. The search list is stored in a rewritable memory medium (not shown) so that it may be updated.

Figure 3:
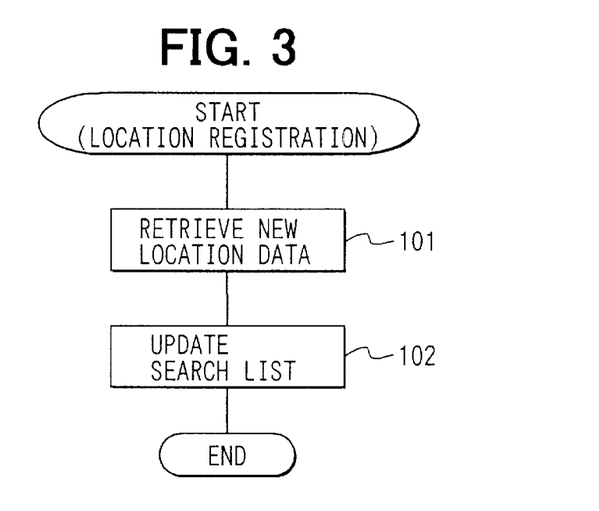
FIG. 3 is a flow diagram showing a location registration process executed in the first embodiment.

A new location is registered by the control unit 8 as shown in FIG. 3. For registering the new location, a user manipulates the operation switches 7 or the remote controller 11 to specify the new location on a map displayed by the display unit 9 by using a cursor. This specified location is registered as a memory location. In this registration operation, the name of the memory location is input in Japanese hiragana characters. The input Japanese hiragana characters may be converted into Chinese characters as the case may be.

Figure 4:
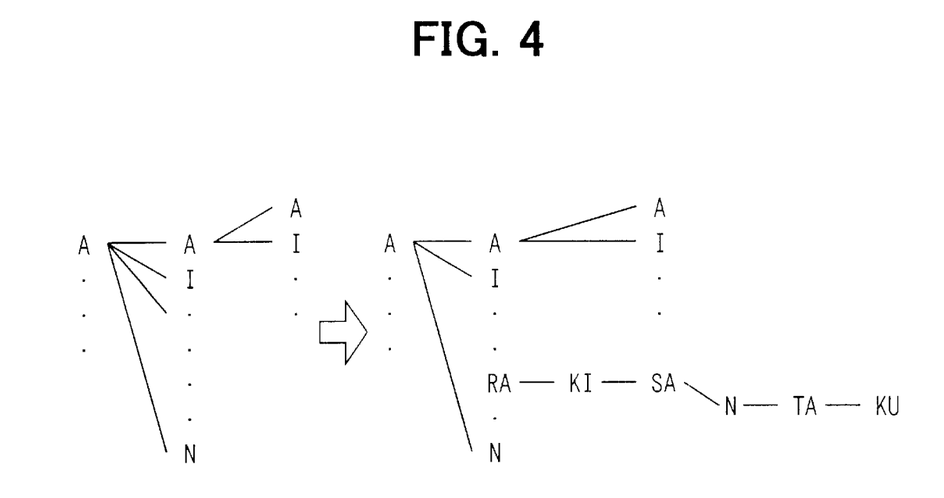
FIG. 4.is a flow diagram showing a process of updating the search tree executed in the first embodiment.

The control unit 8 retrieves the name and data of the registered location at step 101. The location data may be the coordinate specified by the cursor on the displayed map. The control unit 8 then updates the search list at step 102 by adding the name of the memory location. Specifically, as shown in FIG. 4, the search tree in the search list is updated from the top-side pattern to the bottom-side pattern, when "A RA KI SA N TA KU" in Japanese: (Mr. Araki's home in English) is registered as the name of the memory location.

Figure 5:
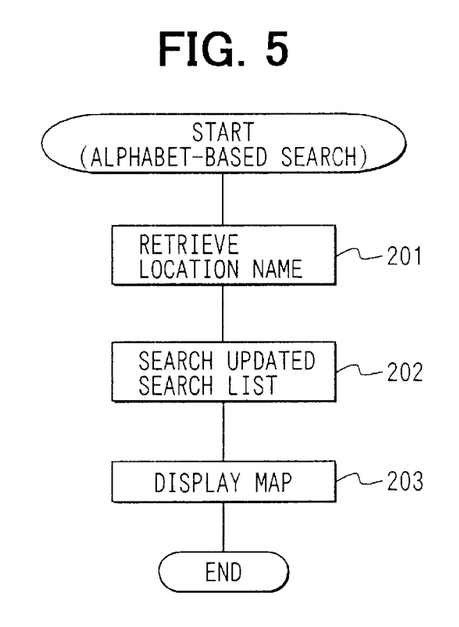
FIG. 5 is a flow diagram showing an alphabet-based search executed in the first embodiment.

The control unit 8 executes an alphabet-based search as shown in FIG. 5. For the alphabet-based search, the user manipulates the operation switches 7 or the remote controller 11 to input the name of a target location of search, which may be a primarily stored facility or the registered memory location.

The control unit 8 retrieves the input location name at step 201, and searches for the target location from the input location name at step 202 by using the updated search list. The control unit 8 drives, at step 203, the display unit 9 to display a map, which includes therein the searched target location based on the coordinate data of the target location.

Thus, the memory location, which the user registered separately from the pre-stored locations, can be made the subject of the alphabet-based search. It is of course possible to use the searched target location as the destination or the passing point of the travel route guidance in addition to a simple display on the map.

Second Embodiment

In a second embodiment, a memory location is registered in a search list separate from an original search list, which pre-stores names of locations such as facilities, in place of updating an original search list (first embodiment).

Figure 6:
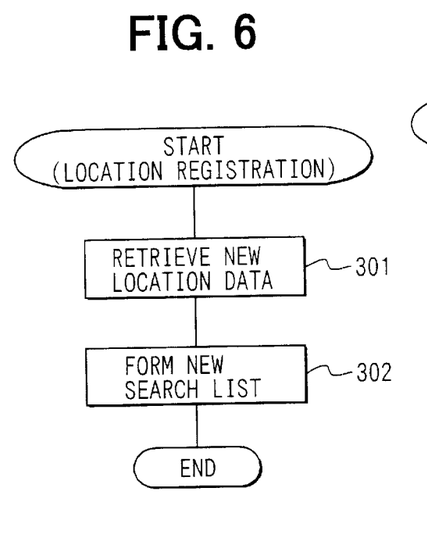
FIG. 6 is a flow diagram showing a location registration process executed in a second embodiment of the present invention.
Figure 7A:
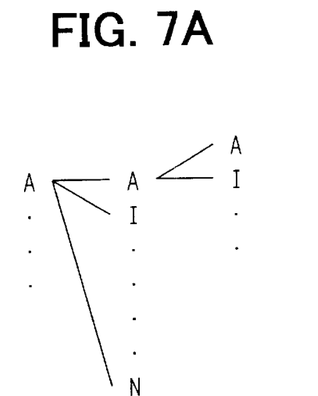
FIGS. 7A and 7B are diagrams search trees in an original search list and anew search list used in the second embodiment.
Figure 7B:
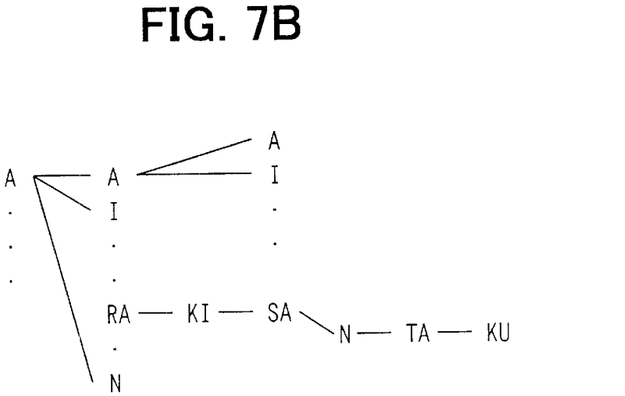

A new location is registered by the control unit 8 as shown in FIG. 6. The control unit 8 retrieves the name and data of the registered location at step 301 in the similar manner as at step 101 (FIG. 3). The control unit 8 then forms a new search list at step 302 to add the name of the memory location separately from the original search list. Specifically, as shown in FIG. 7B, a new search tree is formed in the new search list in addition to the original search tree shown in FIG. 7A, when "A RA KI SA N TA KU" in Japanese. (Mr. Araki s home in English) is registered as the name of the memory location.

Figure 8:
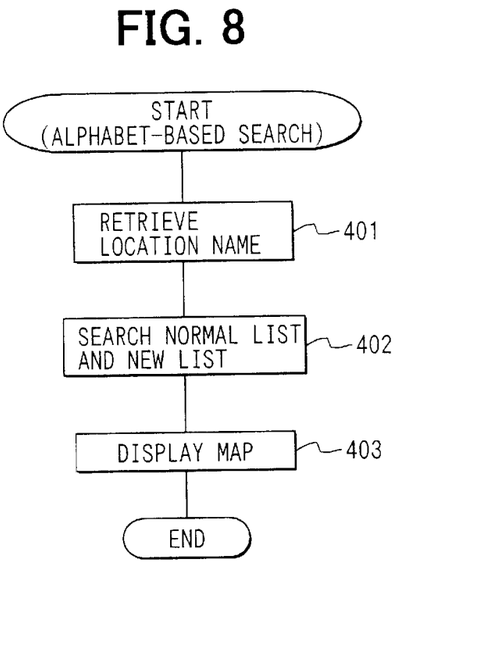
FIG. 8 is a flow diagram showing an alphabet-based search executed in the second embodiment.

The control unit 8 executes the alphabet-based search as shown in FIG. 8. The control unit 8 retrieves the input location name at step 401 in the similar manner as at step 201 (FIG. 5), and searches for the target location from the input location name at step 402 by using both the original (normal) search list and the new search list. In this instance, the search may first be conducted by referring to either one of the original list and the new list, and then referring to the other of the lists only when the target location is not found in the first-searched list. The control unit 8 drives, at step 403, the display unit 9 to display a map, which includes therein the searched target location based on the coordinate data of the target location.

Third Embodiment

In a third embodiment, the navigation system is provided with functions of facility search and surroundings search in addition to the above alphabet-based search.

Figure 9:
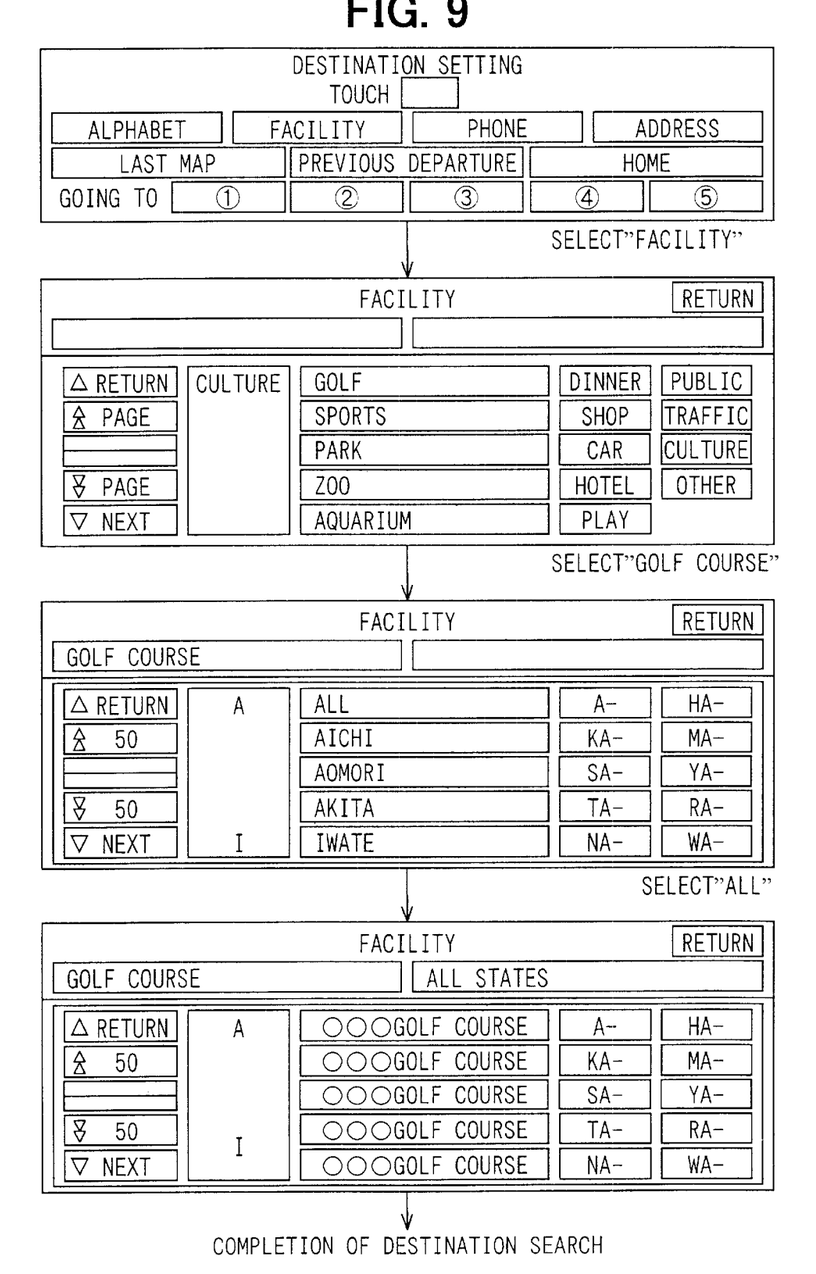
FIG. 9 is a diagram showing menus used for a facility search and a surroundings search in a third embodiment of the present invention.

The facility search is conducted as shown in FIG. 9. In case of searching a travel destination, the display unit 9 is driven to display a menu screen for setting a destination (top screen in the figure). If "FACILITY" is selected by a user as a search method thus designating the facility search, the display unit 9 is driven to display the next screen for selecting a facility type (second top screen in the figure). If "GOLF" is selected as the facility type, the display unit 9 is driven to display the further next screen for selecting areas (third top screen in the figure). If "ALL" is selected as the area, the facility search is conducted by the control unit 8 with respect to all over the country, and the display unit 9 is driven to display a list of searched golf courses (bottom screen in the figure). If one of the golf courses is selected, it is set as the destination. In the above sequence of selections, the displayed items may be scrolled. This facility search is used not only for setting the destination but also for displaying a map, which includes the searched location.

The surroundings search may be conducted in the similar manner as in the facility search. That is, the display unit 9 is driven to display various menu screens (not shown) so that a user may selects a surrounding search, facility type and specified location (for instance present location) in sequence. Thus, all the locations surrounding the specified location are searched for. The surrounding location may be limited to be within a fixed radius from the specified location. The display unit 9 is driven to display the searched locations are displayed with markings. or labels or as a list of surrounding locations.

Figure 10:
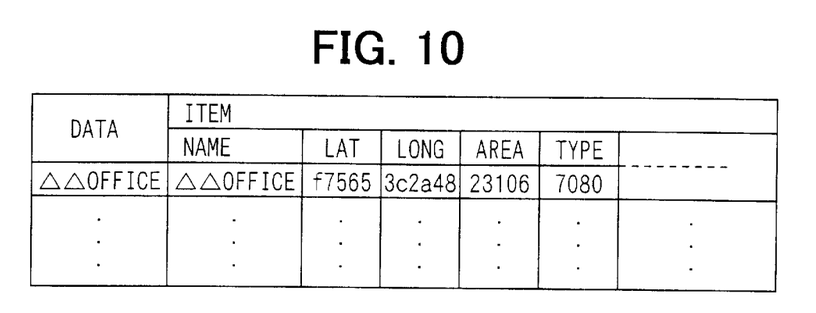
FIG. 10 is a diagram showing a search list used in the facility search and the surroundings search executed in the third embodiment.

The control unit 8 also uses a search list shown in FIG. 10 for the facility search and the surroundings search. This search list includes, for instance, a series of data of the name, coordinate (latitude and longitude), area, facility type and the like of each location to be searched for. The area and the facility type may be set as a code, which is a combination of English alphabets and Arabic numerals. The search list is stored in a rewritable memory medium so that it may be updated from time to time as in the first embodiment.

In this embodiment, a new location is registered as follows. That is, the user first inputs the new location by specifying the new location on a map displayed on the display unit 9. In this instance, a cursor may be moved to specify the location by manipulating the switches 7 or the remote controller 11 in the similar manner as in the foregoing embodiments. This specified new location is defined with its name, area, facility type and the like.

Figure 11:
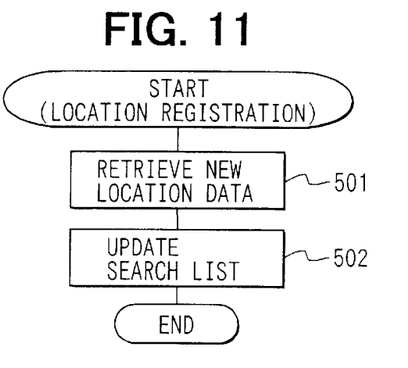
FIG. 11 is a flow diagram showing a location registration process executed in the third,embodiment.

The control unit 8 retrieves at step 501 the data of name, area and facility type of the new location specified by the user as well as the location data such a coordinate specified by the cursor. The control unit 8 then updates the search list a step 502 with those new retrieved data. Specifically, those data are added as a set of data train of one location in the search list shown in FIG. 10.

Figure 12:
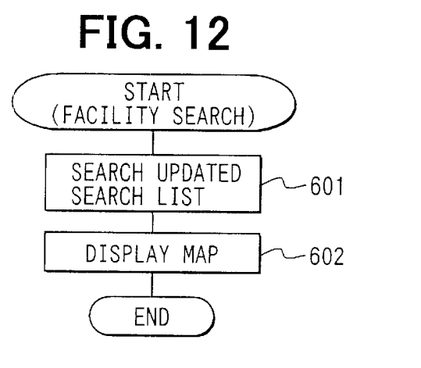
FIG. 12 is a flow diagram showing a facility search executed in the third embodiment.

In this embodiment, the control unit 8 executes the facility search as shown in FIG. 12. The control unit 8 drives the display 9 to provide the sequence of menus as described in FIG. 9 so that the user selects one of the listed facilities. The control unit 8 executes this processing at step 601. The control unit 8 then drives the display unit 9 at step 602 to display the map including the searched facility. The searched facility may be used as the destination or the passing point in guiding the travel route as well. In this embodiment, the newly registered location can be made the target of the facility search, because the updated search list is used at step 601 in the facility search by the control unit 8.

Figure 13:
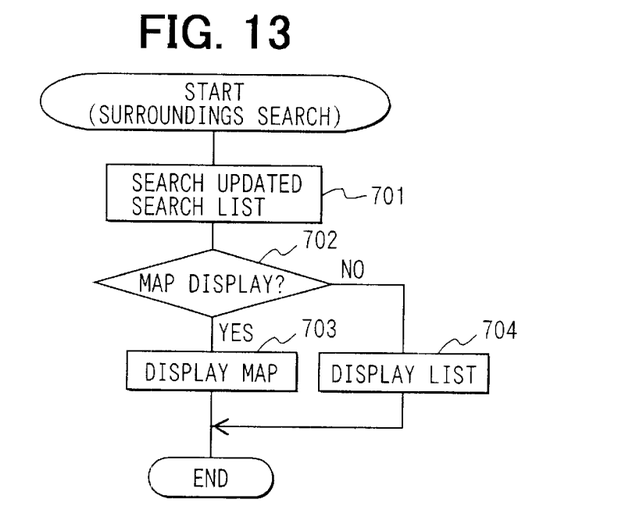
FIG. 13 is a flow diagram showing a surroundings search executed in the third embodiment.

The control unit 8 executes the surroundings search as shown in FIG. 13. When the user selects the surroundings search and the facility type as described above, the control unit 8 searches at step 701 the updated search list for all relevant locations, which surround a specific location (for instance present location), based on the selected facility type. The control unit 8 then checks at step 702 whether a display of a map or a list is selected by the user. If the user selects the map display (YES at step 702), the control unit 8 drives the display unit 9 at step 703 to display a map with all searched locations being indicated with respective markings. If the user selects the list display .(NO at step 702), the control unit 8 drives the display unit 9 at step 704 to display a list of all searched locations. It is possible to display only a part of locations of the list while enabling all other locations of the list to be displayed in sequence by scrolling.

Fourth Embodiment

Figure 14:
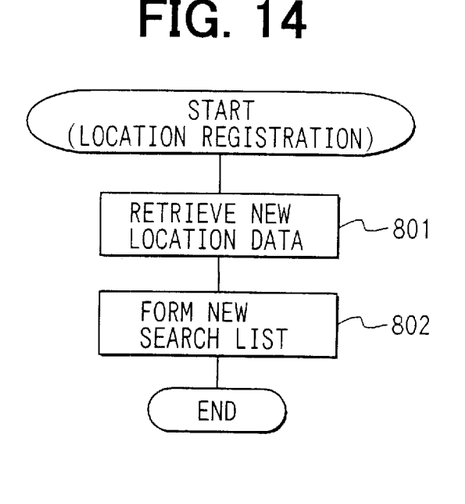
FIG. 14 ,is a flow diagram showing a location registration process executed in a fourth embodiment of the present invention.

In a fourth embodiment, the new registered location is stored in a new search list, and the facility search and the surroundings search are conducted by using both of the original search list for the pre-stored locations and the new search list for the new locations.

specifically, the control unit 8 executes the new location registration as shown in FIG. 14. The control unit 8 first retrieves at step 801 various data such as the name, area, facility type and the like of the new location input by the user in the same manner as in the third embodiment. The control unit 8 forms a new search list using this retrieved data at step 802. This new search list is different from the original list which stores only. fixed locations, and is formed in the similar manner as the original list shown in FIG. 10.

Figure 15:
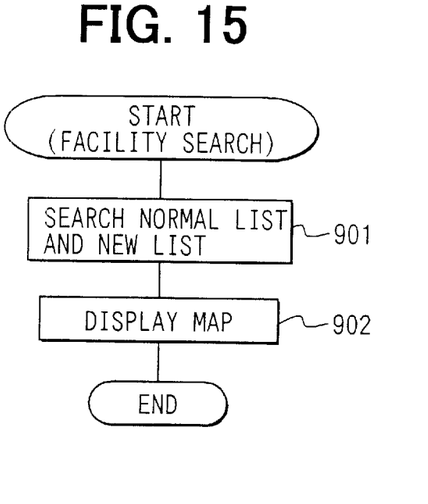
FIG. 15 is a flow diagram showing a facility search executed in the fourth embodiment.

The control unit 8 executes the facility search as shown in FIG. 15. The control unit 8 drives the display 9 to provide the sequence of menus so that the user selects one of the listed facilities. The control unit 8 executes this processing at step 901. In this instance, the control unit 8 starts searching from the original search list, and then refers to the new search list when no relevant location is. found in the original search list. It is of course possible to start searching from the new search list. The control unit 8 then drives the display unit 9 at step 902 to display the map including the searched facility based on the coordinate data of the searched location. The searched facility may be used as the destination or the passing point in guiding the travel route as well.

Figure 16:
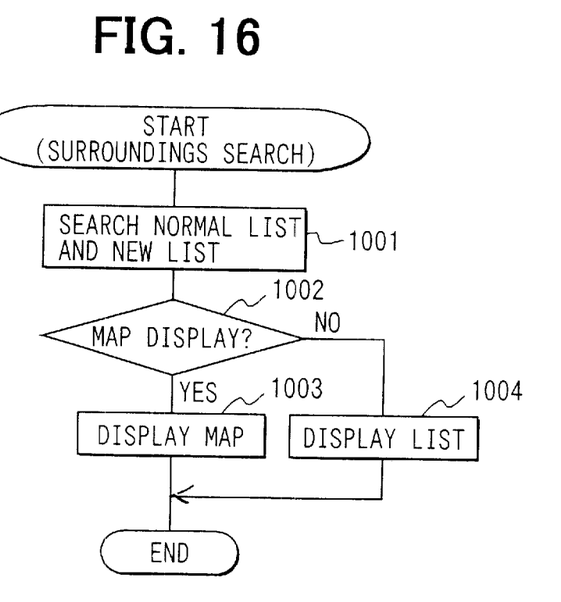
FIG. 16 is a flow diagrams showing a surroundings search executed in the fourth embodiment.

The control unit 8 also executes the surroundings search as shown in FIG. 16. When the user selects the surroundings search and the facility type in the same manner as in the third embodiment, the control unit 8 searches at step 1001 the search lists for all relevant locations, which surround a specific location (for instance present location), based on the selected facility type. This searching may be executed from the original search list or from the new search list. The control unit 8 then checks at step 1002 whether a display of a map or a list is selected by the user. If the user selects the map display (YES at step 1002)., the control unit 8 drives the display unit 9 at step 1003 to display a map with all searched locations being indicated with respective markings. If the user selects the list display (NO at step 1002), the control unit 8 drives the display unit 9 at step 1004 to display a list of all searched locations.

The present invention should not be limited to the disclosed embodiments, but may be implemented in various ways without departing from the spirit of the invention.

What is claimed is:

1. A navigation system comprising:

search means for searching a search list for a target location in response to a location name input externally;

registration means for registering a new location input externally; and updating means for updating the search list by adding a name of the registered new location in the search list, so that the updated search list is used by the search means in searching the target location.

2. A navigation system comprising:

search means for searching a first search list for a target location in response to a location name input externally;

registration means for registering a new location input externally; and forming means for forming a second search list which includes a name of the registered new location so that the second search list is used together with the first search list by the search means in searching the target location.

3. A navigation system comprising:

search means for searching a search list for a target location in response to a facility type selected externally;

registration means for registering a new location including its facility type and input externally; and updating means for updating the search list by adding the registered new location in the search list, so that the updated search list is used by the search means in searching the target location.

4. A navigation system comprising:

search means for searching a first search list for a target location in response to a facility type selected externally;

registration means for registering a new location including its facility type and input externally; and forming means for forming a second search list which includes the registered new location so that the second search list is used together with the first search list by the search means in searching the target location.

5. The navigation system as in claim 4, wherein:

the search means has a function of a surroundings search, which searches for facilities surrounding the target location; and the search means searches for the facilities surrounding the target location by searching both the first search list and the second search list when the surroundings search is requested externally.

6. A method of operating a navigation system having a rewritable memory which stores-data of a plurality of locations, the method comprising steps of:

inputting from an external side data of a new location other than the plurality of locations.;

storing the data of the new location in the rewritable memory in addition to the data of the plurality of locations; and requesting a search of a target location from the external side;

searching the rewritable memory for the target location requested from the external side with reference to the data of the plurality of locations and the new location.

7. The method as in claim 6, wherein:

the requesting step defines the target location by a location name; and the searching step conducts a search based on alphabets defined by the requesting step.

8. The method as in claim 6, wherein:

the requesting step defines the target location by a facility type; and the searching step conducts a search based on the facility type defined by the requesting step.

9. The method as in claim 6, wherein:

the requesting step defines the target location along with a request for a surrounding search; and the searching step conducts searching for surrounding locations other than the target location.

10. The method as in claim 6, further comprising a step of:

displaying, on a display unit, the target location searched by the searching step.

* * * * *